(12) United States Patent
Hagen et al.

(10) Patent No.: US 11,042,815 B2
(45) Date of Patent: Jun. 22, 2021

(54) HIERARCHICAL CLASSIFIERS

(71) Applicant: Trend Micro Incorporated, Tokyo (JP)

(72) Inventors: Josiah Dede Hagen, Austin, TX (US); Brandon Niemczyk, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 911 days.

(21) Appl. No.: 15/729,362

(22) Filed: Oct. 10, 2017

(65) Prior Publication Data
US 2018/0032917 A1 Feb. 1, 2018

Related U.S. Application Data

(63) Continuation of application No. PCT/US2015/026398, filed on Apr. 17, 2015.

(51) Int. Cl.
| | | |
|---|---|---|
| G06F 15/18 | (2006.01) | |
| G06N 20/00 | (2019.01) | |
| G06K 9/62 | (2006.01) | |
| G06N 5/04 | (2006.01) | |

(52) U.S. Cl.
CPC ........... *G06N 20/00* (2019.01); *G06K 9/6227* (2013.01); *G06K 9/6256* (2013.01); *G06K 9/6282* (2013.01); *G06N 5/04* (2013.01)

(58) Field of Classification Search
CPC ........ G06N 20/00; G06N 5/04; G06K 9/6227; G06K 9/6256; G06K 9/6282
See application file for complete search history.

(56) References Cited

U.S. PATENT DOCUMENTS

| | | |
|---|---|---|
| 8,768,868 B1 | 7/2014 | Cheng et al. |
| 2004/0064464 A1* | 4/2004 | Forman ................... G06F 16/35 |
| 2007/0112556 A1 | 5/2007 | Lavi et al. |
| 2008/0126280 A1 | 5/2008 | Liu et al. |
| 2008/0319932 A1 | 12/2008 | Yih et al. |

FOREIGN PATENT DOCUMENTS

WO WO 02 059746 A1 8/2002

OTHER PUBLICATIONS

Susan Dumais, Hierarchical Classification of Web Content, SIGIR 2000 (Year: 2000).*

(Continued)

*Primary Examiner* — Kakali Chaki
*Assistant Examiner* — Su-Ting Chuang
(74) *Attorney, Agent, or Firm* — Okamoto & Benedicto LLP

(57) ABSTRACT

Examples relate to providing hierarchical classifiers. In some examples, a superclass classifier of a hierarchy of classifiers is trained with a first type of prediction threshold, where the superclass classifier classifies data into one of a number of subclasses. At this stage, a subclass classifier is trained with a second type of prediction threshold, where the subclass classifier classifies the data into one of a number of classes. The first type of prediction threshold of the superclass classifier and the second type of prediction threshold of the subclass classifier are alternatively applied to classify data segments.

8 Claims, 4 Drawing Sheets

(56) References Cited

OTHER PUBLICATIONS

Zhicheng Yan, HD-CNN: Hierarchical Deep Convolutional Neural Network for Image Classification, Feb. 28, 2015, ICLR 2015 (Year: 2015).*

Silla, A survey of hierarchical classification across different application domains, Data Mining and Knowledge Discovery vol. 22, pp. 31-72(2011) (Year: 2011).*

Ricardo Cerri, Hierarchical multi-label classification using local neural networks, Mar. 22, 2013, Journal of Computer and System Sciences (Year: 2013).*

* cited by examiner

HIERARCHICAL CLASSIFIERS

CROSS-REFERENCE TO RELATED APPLICATION

This application is a continuation of International Application No. PCT/US2015/026398, with an International Filing Date of Apr. 17, 2015, which is incorporated herein by reference in its entirety.

BACKGROUND

Classifiers can be used to statistically categorize observed data into categories. For example, classifiers can be used on a data server to identify malicious data packets, to identify spam messages for an email service, etc. When using classifiers in machine learning applications, statistical measures of the classifiers can be tuned. Classifiers are often tuned to favor high precision, high recall, low fallout, or low miss rate depending on the goal of the application. Tuning classifiers for classification problems can be performed by comparing all pairs of classes for two given statistical measures (e.g., how improving recall for a first class affects precision for second class).

BRIEF DESCRIPTION OF THE DRAWINGS

The following detailed description references the drawings, wherein.

DETAILED DESCRIPTION

Figure 4:
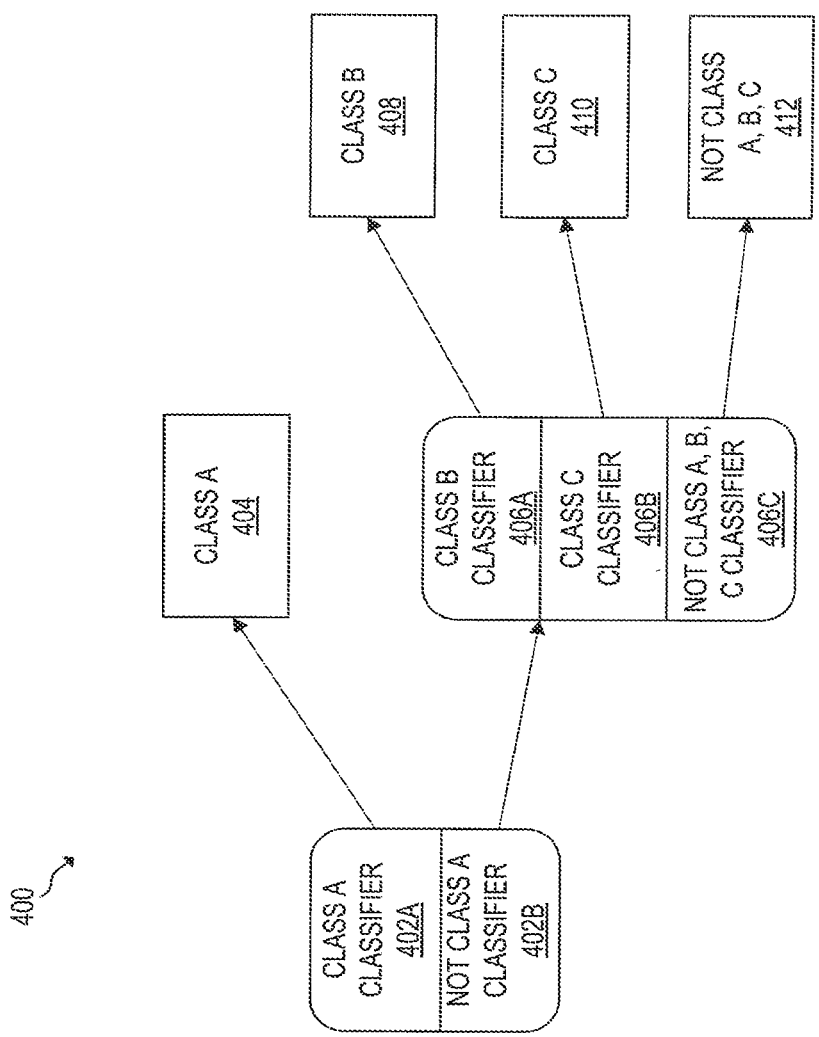
FIG. 4 is an example hierarchy of classifiers that can be trained and applied to observed data.

As described above, classifiers can be tuned by comparing all pairs of classes for two statistical measures. Using traditional analytical methods, such as methods involving the Receiver Operator Characteristic (ROC) or Detection Error Tradeoff (DET), the tradeoff between, for example, fall-out and recall can be analyzed by comparing all pairs of classes for c classes (i.e., $c*(c-1)/2$). Introducing a hierarchy reduces the number of comparisons if choosing to still compare all pairs. A hierarchy defines relationships (e.g., parent-child relationships) between classes. In this description, the hierarchy includes classifiers and their corresponding classes as shown in FIG. 4, where the classifiers correspond to decision points in the hierarchy that ultimately lead to classes in the bottom level of the hierarchy. For example, a classifier may be applied to observation data to classify the data into a corresponding class. A superclass in the hierarchy includes multiple subclasses (e.g., superclass A, B, C includes subclass A, subclass B, and subclass C).

For example, if a first class is maintained as is and all of the others classes are grouped into a second class, using the all class comparison method could compare the first class to the second class in a single comparison, and then all subclasses of the second class can be compared to each other (i.e., $(c-1)*(c-2)/2$). In this example, the introduction of the hierarchy is minimal yet already provides benefit by reducing the comparison count. The hierarchy of classifiers provide the ability to train a classification of a superclass for one statistical measure (e.g., precision, recall, fallout, miss rate, etc.) and its subclasses for another statistical measure. Further, when classes are broken into subclasses, alternating tuning for one of characteristics (e.g., precision for the superclass and recall for the subclass) can provide better results than tuning tradeoffs between classes using the traditional analytical methods.

In some examples, a superclass of a hierarchy of classifiers is trained with a first type of prediction threshold, where the superclass classifies data into one of a number of subclasses. At this stage, a subclass is trained with a second type of prediction threshold, where the subclass classifies the data into one of a number of classes. The first type of prediction threshold of the superclass and the second type of prediction threshold of the subclass are alternatively applied to the data segments to classify the data segments. In this example, the hierarchy of classifiers can be preconfigured by an administrator (i.e., the administrator can use a computing device to define the superclass classifiers and subclass classifiers in the hierarchy and the relationships between them).

Figure 1:
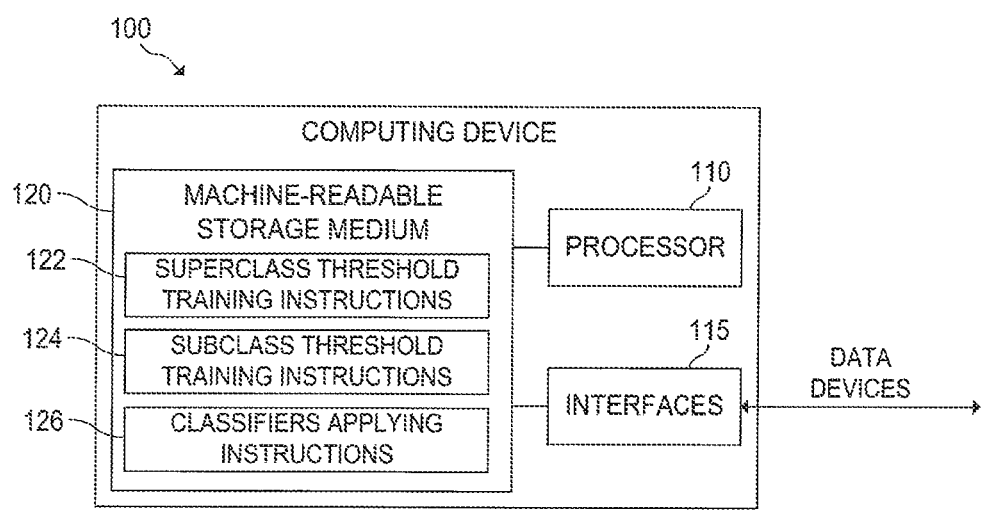
FIG. 1 is a block diagram of an example computing device for providing hierarchical classifiers.

Referring now to the drawings, FIG. 1 is a block diagram of an example computing device 100 for providing hierarchical classifiers. The example computing device 100 may be a desktop computer, server, notebook computer, tablet, or other device suitable for analyzing hardware systems as described below. In the example of FIG. 1, computing device 100 includes processor 110, interfaces 115, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to enable providing hierarchical classifiers, as described below. As an alternative or in addition to retrieving and executing instructions, processor 110 may include one or more electronic circuits comprising a number of electronic components for performing the functionality of one or more of instructions 122, 124, 126.

Interfaces 115 may include a number of electronic components for communicating with computing devices. For example, interfaces 115 may be wireless interfaces such as wireless local area network (WLAN) interfaces and/or physical interfaces such as Ethernet interfaces, Universal Serial Bus (USB) interfaces, external Serial Advanced Technology Attachment (eSATA) interfaces, or any other physical connection interface suitable for communication with end devices. In operation, as detailed below, interfaces 115 may be used to send and receive data to and from other computing devices.

Machine-readable storage medium 120 may be any electronic, magnetic, optical, or other physical storage device that stores executable instructions. Thus, machine-readable storage medium 120 may be, for example, Random Access Memory (RAM), Content Addressable Memory (CAM), Ternary Content Addressable Memory (TCAM), an Electrically-Erasable Programmable Read-Only Memory (EEPROM), flash memory, a storage drive, an optical disc, and the like. As described in detail below, machine-readable storage medium 120 may be encoded with executable instructions for providing hierarchical classifiers.

Superclass threshold training instructions 122 train the prediction threshold of a superclass classifier in a hierarchy of classifiers. Examples of prediction thresholds include a recall threshold, a precision threshold, a fall-out threshold, a miss rate threshold, etc. In some cases, the prediction threshold of the superclass classifier can be preconfigured by an administrator who created the hierarchy of classifiers. To train the classifiers, a known dataset can be divided into training data, test data, and cross-validation data. The classifier of the superclass can be trained with the prediction threshold using the training data. Then, it can be determined how well (i.e., whether the prediction threshold is satisfied) the classifier performs and how tuning classification parameters (e.g., explanatory variables, dependent variables, etc.) of the classifier for the superclass would optimize classification using the test data. The tuned classifier can be used to classify a cross-validation set and score (e.g., F-scores) the classifier based on the results. This process can be repeated with different permutation of the original dataset into training, test and cross-validation data to ensure that performance is consistent across different dataset selections.

Subclass threshold training instructions 124 train the prediction threshold of a subclass classifier of the superclass. The classifier for the subclass can be trained similar to as described above with respect to the superclass classifier. Further, each classifier in the hierarchy of classifiers can be trained as described above, where a different prediction threshold (e.g., precision, recall, fallout, miss rate, etc.) can be used for each classifier as specified by an administrator. In this manner, each classifier in the hierarchy can optimize for different characteristics when applied to observed data.

The superclass classifiers and subclass classifiers can be defined in the hierarchy by an administrator. For example, the administrator can use a user interface provided by computing device 100 to visually build a hierarchy of classifiers that classify superclasses and subclasses.

Classifiers applying instructions 126 apply the hierarchy of classifiers to observed data. Specifically, the hierarchy of classifiers can be used when performing a statistical classification of the observed data. In this case, the statistical classification is performed according to the hierarchy by starting at the root classifier of the hierarchy and then traversing the hierarchy according to the classification of the observed data at each class in the hierarchy. For example, the hierarchy of classifiers can be applied to emails to classify messages as high priority messages, spam messages, malicious messages, etc. Not spam can be a superclass, where messages that aren't spam can be classified into subclasses such as priority mail, social media mail, etc. In this example, the "Not spam" classifier can be trained with a precision threshold while each of the subclass classifiers can be trained with a recall threshold.

Figure 2:
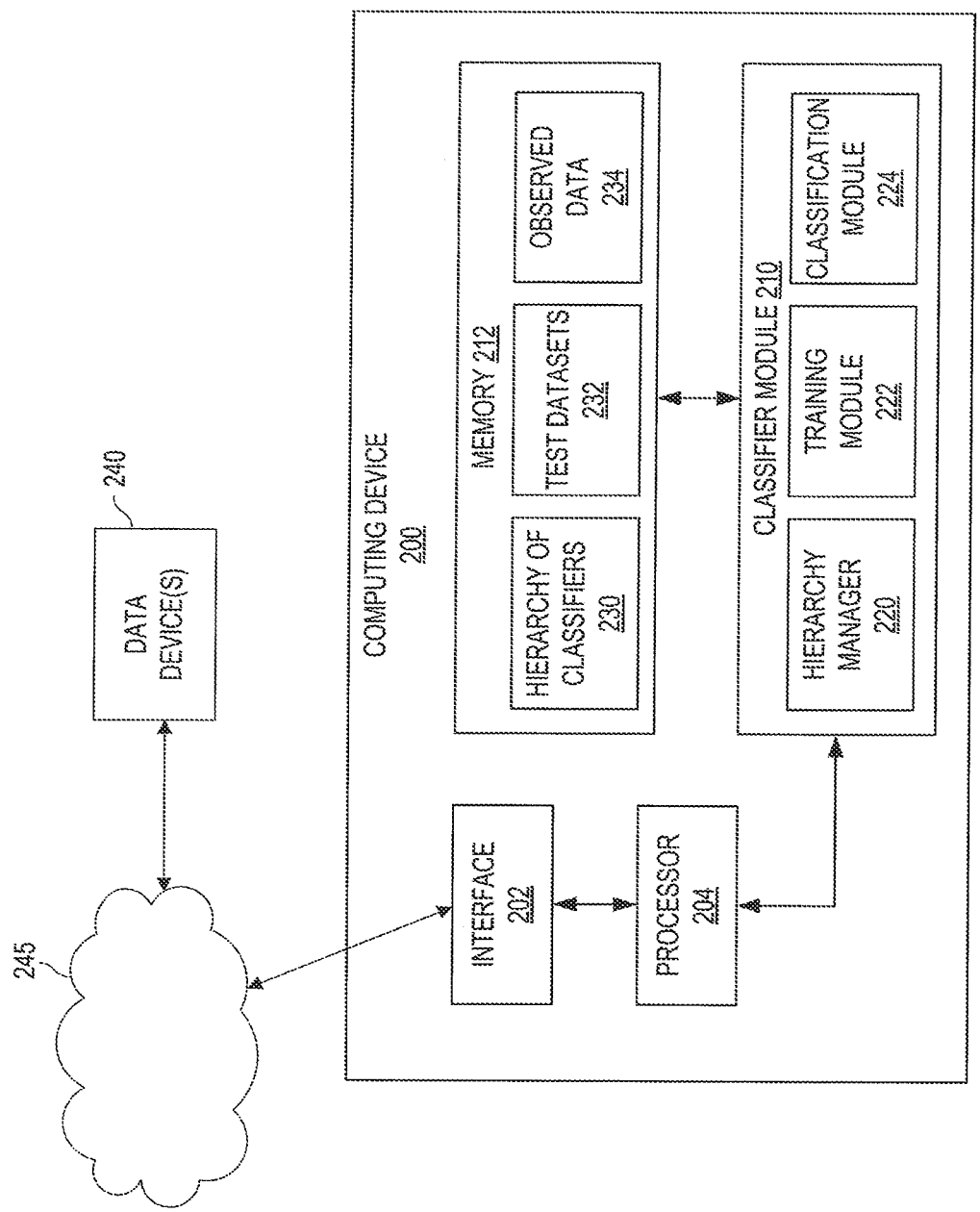
FIG. 2 is a block diagram of an example computing device for providing hierarchical classifiers.

FIG. 2 is a block diagram of a computing device 200 in communication with data device(s) 240 for providing hierarchical classifiers. The components of computing device 200 may be similar to the corresponding components of computing device 100 described with respect to FIG. 1.

As illustrated, computing device 200 may include interface 202, processor 204, classifier module 210, and memory 212. Processor 204 and interfaces 202 may be similar to the corresponding components of computing device 100 that are described above with respect to FIG. 1.

Computing device 200 is connected to data device(s) 240 via interface 202. For example, computing device 200 may be connected to a network 245 such as a LAN or WAN that includes the data device(s) 240. In another example, computing device 200 may be connected to data device(s) 240 by a USB cable. Because computing device 200 is connected to data device(s) 240, computing device 200 is able to obtain data such as training data, test data, cross-validation data, observed data, etc. from the data device(s) 240.

Computing device 200 also includes classifier module 210 for classifying observed data 234 using hierarchical classifiers. Classifier module 210 further includes hierarchy manager 220, training module 222, and classification module 224. Hierarchy manager 220 provides access to hierarchies of classifiers 230 for use in classification. The hierarchy of classifiers 230 can be preconfigured and stored in, for example, a database accessible to hierarchy manager 220. In some cases, hierarchy manager 220 allows an administrator to generate a hierarchy of classifiers 230 such as described below with respect to FIG. 4. Specifically, hierarchy manager 220 can provide a user interface that allows an administrator to specify hierarchical relationships between classes and to specify prediction thresholds for each of the classifiers.

Training module 222 tunes classifiers with prediction thresholds. For example, classifiers can be trained as described above with respect to instructions 122 and 124. Training module 222 can grade classifiers based on their F-scores, which is the harmonic mean between precision and recall. Precision is the quotient of (true positives)/(true positives+false positives) and, thus, is maximized when false positives are minimized. Recall is the quotient of (true positives)/(true positives+false negatives) and is maximized when false negatives are minimized. In some cases, the hierarchy of classifiers 230 alternates tuning the classifiers for precision and recall within the classifier hierarchy.

Training module 222 can also use machine learning classification methods (e.g., logistic regression, support vector machines, neural network, etc.) that rely on a prediction threshold for a classifier to determine whether a datum is a member of a class or not. These prediction thresholds can be tuned for recall and precision by training module 222 as described below.

For example, selecting a threshold goal for recall for a classifier would specify a recall threshold that is based on predictions of a test dataset 232 for a given candidate class. A target value for the recall threshold is discovered by first sorting all of the prediction values (i.e., values predicted when the candidate class is used to classify datum of the test dataset 232) for the candidate class. The recall goal and the size of the candidate class can then be used to find the prediction value for the datum at the threshold goal size index of the sorted test dataset 232 for the candidate class. In this example, if there are 10 data elements in the test set for a candidate class and a recall goal of 0.9, the test set should be sorted by prediction values and then select the prediction value of the 9th element.

In another example, selecting a precision goal is initiated by selecting a test dataset 232 for all the classes and identifying data classified as the candidate class. The data identified for the candidate class is sorted by the prediction value for each datum in the class. A binary search is used on this data to identify a datum where the precision goal is satisfied. In other words, the number of true positives is examined in the data to the right of a given index, where prediction values are greater. The total number of data to the right of that index is known, which is the true positives and false positives. From this the precision for a given datum is in sorted data and can be used to perform a binary search to find where the precision goal is satisfied. The precision increases as the prediction value increases if the classifier is better than random.

Note that picking a threshold goal for recall and precision is often more effective than simply optimizing these values. Optimizing recall could be performed by the above method, choosing a prediction threshold based on the lowest prediction value for any member of the class to be predicted. Often, this will result in excess false positives. Likewise, optimizing precision may result in excluding any false positive. If the highest prediction values are true positives, the lowest such value that does not admit any false positives can be selected, which could result in a very high prediction threshold and thereby significantly reduce recall. Additionally, if some false positives have the highest prediction scores for the candidate class, optimizing precision should then involve search similar to as described above.

Besides precision and recall, training module 222 can use other scores for tuning the classifiers at different points in the classification hierarchy. The other scores correspond to threshold goals that include accuracy (i.e., (true positives+true negatives)/(all positives+all negatives)), specificity (i.e., (true negatives)/(false positives+true negatives)), fall-out (i.e., (false positives)/(false positives+true negatives)), miss rate (i.e., (false negatives)/(false negatives+true positives)), and negative predictive values (NPV) (i.e., (true negatives)/(true negatives+false negatives)). These other threshold goals can be accomplished in a similar manner as setting the prediction thresholds for precision and recall as described above. Additionally, the classifiers can be tuned to discover the prediction threshold for equal-error rate, where precision and recall are equal or where specificity and fall-out are equal. Finally, the classifiers could be tuned to discover the prediction threshold that maximizes the F-score.

Classification module 224 uses hierarchies of classifiers 230 to classify observed data 234. Specifically, each element of an observed dataset 234 can be processed through alternating prediction thresholds in a hierarchy of classifiers 230. The prediction thresholds may be tuned as described above. Because superclasses and subclasses have separate prediction thresholds, each level of the hierarchy can be optimized for a different threshold goal.

Memory 212 stores data for use by computing device 200. As shown, memory includes hierarchy of classifiers 230, test datasets 232, and observed data 234. Similar to machine-readable storage medium 120 of FIG. 1, memory 212 may be, for example, RAM, CAM, TCAM, EEPROM, flash memory, a storage drive, an optical disc, etc.

Data device(s) 240 store data that can be processed by classifier module 210 of computing device. Examples of data device(s) include, but are not limited to, email servers, web servers, etc.

Figure 3:
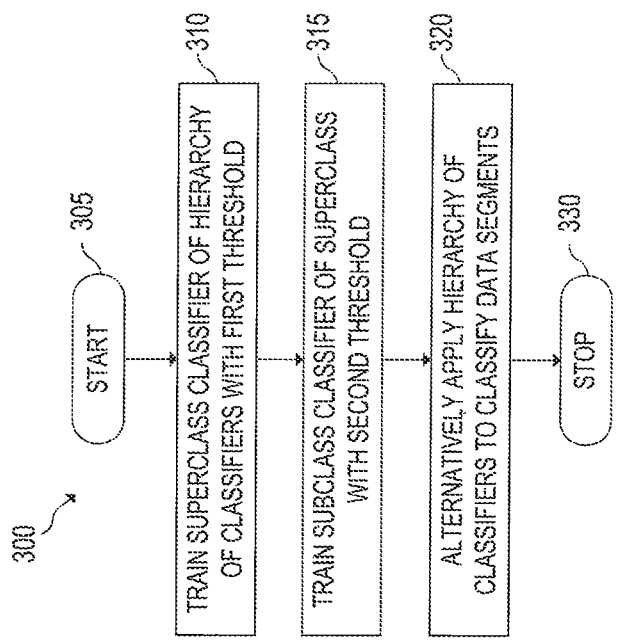
FIG. 3 is a flowchart of an example method for execution by a computing device for providing hierarchical classifiers.

FIG. 3 is a flowchart of an example method 300 for execution by a computing device 100 for providing hierarchical classifiers. Although execution of method 300 is described below with reference to computing device 100 of FIG. 1, other suitable devices for execution of method 300 may be used such as computing device 200 of FIG. 2. Method 300 may be implemented in the form of executable instructions stored on a machine-readable storage medium, such as computer readable medium 120 of FIG. 1, and/or in the form of electronic circuitry.

Method 300 may start in block 305 and continue to block 310, where computing device 100 trains the prediction threshold of a superclass in a hierarchy of classifiers. In this example, the prediction threshold has been preconfigured by an administrator to satisfy threshold goals of the superclass. In block 315, computing device 100 trains the prediction threshold of a subclass of the superclass. The superclass has been preconfigured by an administrator with a different prediction threshold than the superclass based on threshold goals of the subclass.

In block 320, computing device 100 applies the hierarchy of classifiers to observed data. Because the superclass and subclass have different prediction thresholds, the application of the hierarchy of classifiers alternates between the different threshold goals as the observed data is processed. Method 300 may then continue block 330, where method 300 may stop.

FIG. 4 is an example hierarchy of classifiers 400 that can be trained and applied to observed data. The hierarchy of classifiers 400 shows classifiers hierarchically arranged into superclasses and subclasses. The root of hierarchy 400 is class A classifier 402A and not class A classifier 402B, which can be associated with, for example, a recall threshold. When observed data is processed at class A classifiers 402A, 402B, the recall threshold is applied to optimize the classification. In this case, the recall threshold minimizes false negatives (i.e., false "not class A's"), and observed data is classified as either class A 404 or "not class A".

Data classified as "Not class A" is processed by class B classifier 406A, class C classifier 406B, not class A, B, C classifier 406C. In this example, the "not class A" classifiers 406A, 406B, 406C can be associated a precision threshold. The precision threshold is applied when observed data is classified as class B 408, class C 410, or "not class A, B, C" 412.

The foregoing disclosure describes a number of examples for providing hierarchical classifiers. The examples disclosed herein facilitate classifying observed data by using a hierarchy of classifiers to allow for targeted precision thresholds to be applied to different levels of the hierarchy of classifiers.

We claim:

1. A computing device for providing hierarchical classifiers, the computing device comprising a processor and a memory, the memory storing instructions that when executed by the processor cause the computing device to:
    train a superclass classifier of a hierarchy of classifiers with a recall prediction threshold to classify data into one of a plurality of subclasses, wherein the recall prediction threshold minimizes false negatives;
    train a subclass classifier of the plurality of subclasses with a precision prediction threshold to classify the data into one of a plurality of classes, wherein the precision prediction threshold minimizes false positives; and
    provide the superclass classifier and the subclass classifier to classify observed data to identify malicious data in the observed data,
    wherein the recall prediction threshold of the superclass classifier and the precision prediction threshold of the subclass classifier are separate from one another.

2. The computing device of claim 1, wherein the instructions stored in the memory when executed by the processor cause the computing device to apply test data to the hierarchy of classifiers to determine if the recall prediction threshold and the precision prediction threshold are satisfied.

3. The computing device of claim 1, wherein the recall prediction threshold of the superclass classifier is set to meet a selected recall prediction threshold goal based on prediction values generated by the superclass classifier for a first test dataset for a given subclass of the plurality of subclasses.

4. The computing device of claim 1, wherein the precision prediction threshold of the subclass classifier is set to meet a selected precision prediction threshold goal based on prediction values generated by the subclass classifier for a second test dataset.

5. A method for providing hierarchical classifiers, comprising:
- training a superclass classifier of a hierarchy of classifiers with a recall prediction threshold to classify data into one of a plurality of subclasses, wherein the recall prediction threshold minimizes false negatives;
- training a subclass classifier of the plurality of subclasses with a precision prediction threshold to classify the data into one of a plurality of classes, wherein the precision prediction threshold minimizes false positives; and
- classifying observed data using the superclass classifier and the subclass classifier to identify malicious data in the observed data,
- wherein the recall prediction threshold of the superclass classifier and the precision prediction threshold of the subclass classifier are separate from one another.

6. The method of claim 5, further comprising applying test data to the hierarchy of classifiers to determine if the recall prediction threshold and the precision prediction threshold are satisfied.

7. The method of claim 5, wherein the recall prediction threshold of the superclass classifier is set to meet a selected recall prediction threshold goal based on prediction values generated by the superclass classifier for a first test dataset for a given subclass of the plurality of subclasses.

8. The method of claim 5, wherein the precision prediction threshold of the subclass classifier is set to meet a selected precision prediction threshold goal based on prediction values generated by the subclass classifier for a second test dataset.

* * * * *